2,802,719

PROCESS OF PREPARING COMPLETELY CARBONATED LIME

Souren Z. Avedikian, Westchester County, N. Y.

No Drawing. Application May 7, 1954,
Serial No. 428,383

4 Claims. (Cl. 23—66)

This invention relates to a process for complete carbonation of alkaline earth oxides and more particularly to the complete carbonation of calcium oxide.

Calcium carbonate of extreme fineness is used as a filler in rubber to enhance the strength and as pigment or extender in the paint industry. Thus calcium carbonate, for example, of about 1 micron particle size is used in the manufacture of automobile inner tubes to obtain tubes of increased strength over tubes having calcium carbonate filler particles of substantially greater particle size.

In the prior art preparation of calcium carbonate suitable for fillers, pigments and the like complete carbonation of calcium oxide or calcium hydroxide was difficult to achieve except upon prolonged storage under suitable conditions.

It is an object of this invention to provide a process for the rapid and efficient carbonation of metal oxides to completion.

It is a further object of this invention to provide process for the commercial preparation of filler-type calcium carbonate at a minimum cost.

It is another object of this invention to provide a commercial method for the complete "dry" carbonation of lime or hydrated lime.

These and other objects of this invention will become apparent upon reading the following disclosure.

It is known that calcium carbonate exhibits a definite pressure of carbon dioxide at a definite temperature and this pressure is independent of the amount of calcium carbonate present. In other words the law of mass action is applicable to heterogeneous equilibria, if the active masses of the solids present be considered as constant.

In the reaction of lime with carbon dioxide to give calcium carbonate it was discovered that completion of carbonation could be rapidly effected within one to fifteen minutes but preferably within 3 to 7 minutes by subjecting the reaction mass to a temperature of at least 212° F. in the presence of water vapor and gaseous carbon dioxide. Although a minimum temperature of 212° F. is operable, temperatures as high as 600° F. are also operable, but temperatures of 300° F. to 450° F. are preferred.

The preparation of completely carbonated calcium carbonate according to this invention may be carried out, for example, in a ball mill of modified design and having a ball retaining annular rim at an apertured end, with a carbon dioxide feed line or a feed line containing a substantial amount of carbon dioxide, for example, waste lime kiln gas and a water feed line disposed through the aperture and into the ball mill at approximately the axis thereof.

However, other apparatus adapted for pulverizing solid particles, for example, modified tube mills, hammer mills and micronizer, are operable.

Furthermore, the carbonation reaction may be effected in a closed vessel at pressures slightly above atmosphere. In such a closed system the amount of water required to initiate and conduct the carbonation to completeness will be less than that required for operation at atmospheric pressure. Where lime kiln gases having a substantial amount of an inert gas, for example, nitrogen are used, provision is made for periodic venting of said inert gases along with the water vapor. In this closed vessel adaptation of my carbonation process the carbon dioxide gas and pelletized catalytic water are fed intermittently.

In this carbonation process the introduced water behaves as a catalyst so that the reactions for hydrated lime (1) and quick lime (2) may be represented as follows:

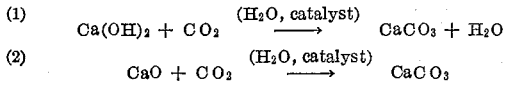

In effect in this carbonation process, all of the water both the catalytic water and the water of combination in the case of lime hydrate, is driven off as water vapor, thereby producing a dry completely carbonated product.

In the preparation of completely carbonated lime according to this invention the ball mill may be heated externally, or internally, for example, by gas or fuel oil flame and the like, so that the ball mill contents are always at least 212° F. The ball mill is provided with a scraper blade contacting the inner cylindrical surface of the ball mill, in order to scrape off any solid material adhering thereto.

In the operation of the mill the reaction mass of calcium carbonate is pulverized into a fluidized state and appears as a dense cloud over and around the balls. This cloud behaves as a blanket and normally prevents rapid passage of water vapor and even steam as well as carbon dioxide introduced thereover.

According to this invention this barrier effect of the fluidized blanket to the introduction of water vapor and carbon dioxide is breached or surmounted by propelling pelletized water therethrough. The size of the water pellets or droplets are such as to most easily penetrate the fluidized blanket of solids and thereafter become vaporous substantially immediately upon approaching or contacting the heated grinding balls. Furthermore the introduction of the propelled pelletized water causes eddy currents in the fluidized blanket or bed so that a mixing is effected whereby the carbon dioxide is brought into intimate contact with the fluidized particles.

The over-all effect of the simultaneous grinding, fluidizing, heating and reacting with pelletized water concurrently with carbon dioxide is that a rapid complete carbonation of lime is done in a minute or in a few minutes. The product is substantially 100 percent calcium carbonate and is suitable as a filler for example, in rubber compounding where even small amounts of unreacted lime are deleterious.

The complete carbonation of lime according to this invention is not to be restricted to a ball mill having a horizontal axis or to any particular apparatus since the process is independent of the apparatus. The important features of the process are the fluidization of the reaction mass to present a multitude of finely divided particles, and the heating of this fluidized bed or blanket of solid material. The pelletizing of water along with its introduction into the body of the fluidized bed where it is vaporized, along with the mixing effect of the turbulence caused by the passage of the water pellets into the fluidized bed in the presence of added carbon dioxide gas, causes the last traces of fluidized lime particles to be rapidly converted to calcium carbonate to produce a fully carbonated product of substantially 100 per cent calcium carbonate.

The process of this invention is clearly not limited to carbonation of lime since the process is equally applicable to dolomitic lime $MgO \cdot CaO$ or dolomitic lime hydrate $Mg(OH)_2 \cdot Ca(OH)_2$ to produce for example, $MgO \cdot CaCO_3$ or $MgCO_3 \cdot CaCO_3$.

Accordingly the process is not to be limited to the illustrative embodiments of the disclosure but only to the claims appearing herein.

I claim:

1. The process of preparing completely carbonated solid carbonated lime from partly carbonated lime consisting essentially of grinding finely said partly carbonated lime to produce a cloud of finely ground particles suspended in air, heating said cloud to between 212° F. and 600° F., propelling a mass of water droplets into said heated cloud, vaporizing said water droplets into steam, and reacting said cloud of hot partly carbonated lime particles with gaseous carbon dioxide in the presence of the nascently formed steam to effect the complete carbonation of the lime.

2. The process of claim 1 wherein the grinding step is effected by a plurality of balls.

3. The process of completely dry carbonating lime consisting of grinding said lime with a plurality of balls in a ball mill to effect pulverization of the lime with formation of a cloud of pulverized lime, heating said ball mill and its contents of grinding balls and cloud of pulverized lime to between 212° F. and 600° F., spraying a mass of finely divided water particles into the heated cloud of finely suspended ground calcareous material, vaporizing instantly said water particles to a steam catalyst and reacting said heated solid particles in the presence of said steam catalyst with carbon dioxide gas to effect complete carbonation of the solid particles.

4. The process of completely carbonating partially carbonated lime consisting of hot grinding said lime with hot grinding balls to produce a cloud of pulverized solid particles having a temperature between 212° F. and 600° F. and suspended over said grinding balls, introducing a fog of finely divided water into said heated cloud to effect the instantaneous vaporization of said water, and treating said hot cloud in the presence of said vapor of water with gaseous carbon dioxide to effect complete carbonation of said solid particles.

References Cited in the file of this patent

UNITED STATES PATENTS

| | | |
|---|---|---|
| 1,762,241 | Pontapiddan | June 10, 1930 |
| 1,810,055 | Muller | June 16, 1931 |
| 1,821,195 | Woodhouse | Sept. 1, 1931 |
| 2,611,680 | Ruth | Sept. 23, 1952 |
| 2,617,711 | McAllister | Nov. 11, 1952 |

OTHER REFERENCES

Rohland: Chemiker Zeitung, vol. 30 (1906), page 808.